No. 839,341. PATENTED DEC. 25, 1906.
H. B. VEEFKIND.
FERTILIZER DISTRIBUTER.
APPLICATION FILED JULY 12, 1906.

2 SHEETS—SHEET 1.

Witnesses
G. R. Thomas
H. E. Chandler

Inventor
H. B. Veefkind
By Chandler & Chandler
Attorneys

No. 839,341. PATENTED DEC. 25, 1906.
H. B. VEEFKIND.
FERTILIZER DISTRIBUTER.
APPLICATION FILED JULY 12, 1906.

2 SHEETS—SHEET 2.

Witnesses
G. R. Thomas
H. L. Chandler

Inventor
H. B. Veefkind
By Chandler & Chandler
Attorneys

UNITED STATES PATENT OFFICE.

HENRY BORN VEEFKIND, OF MANCHESTER, VIRGINIA.

FERTILIZER-DISTRIBUTER.

No. 839,341.   Specification of Letters Patent.   Patented Dec. 25, 1906.

Application filed July 12, 1906. Serial No. 325,907.

*To all whom it may concern:*

Be it known that I, HENRY BORN VEEFKIND, a citizen of the United States, residing at Manchester, in the county of Chesterfield, State of Virginia, have invented certain new and useful Improvements in Fertilizer-Distributers; and I do hereby declare the following to be a full, clear, and exact description of the invention, such as will enable others skilled in the art to which it appertains to make and use the same.

This invention relates to farm implements, and more particularly to fertilizer and seed distributers, and has for its object to provide a distributer which, while being simple, will be efficient and strong.

Another object is to provide a distributer including means for agitating the fertilizer to work it toward the discharge-openings and means for operating the agitating means and for shaking the implement to jolt the fertilizer, and thus prevent packing thereof.

Other objects and advantages will be apparent from the following description, and it is to be understood that I do not desire to be limited to the exact details of construction shown and described, for obvious modifications will occur to a person skilled in the art.

Figure 1:
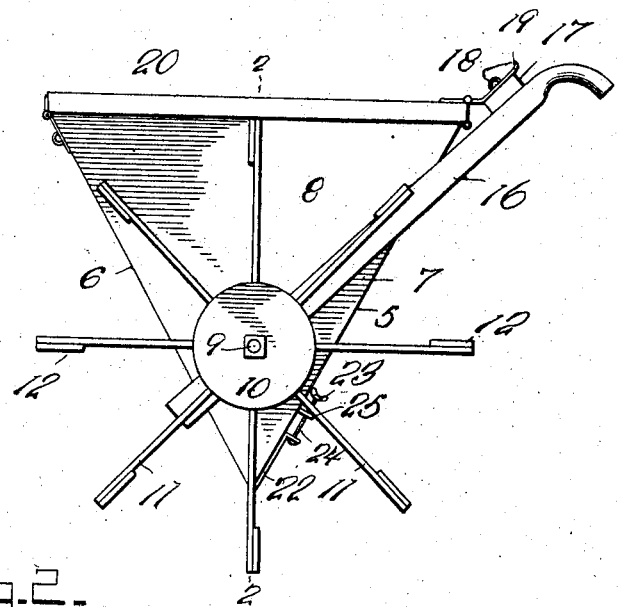
Figure 2:
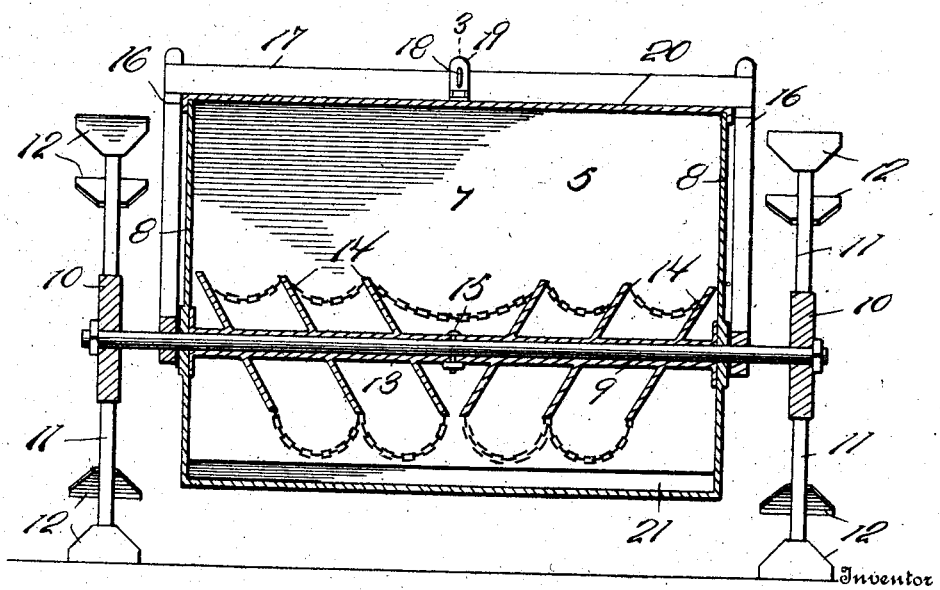
Figure 3:
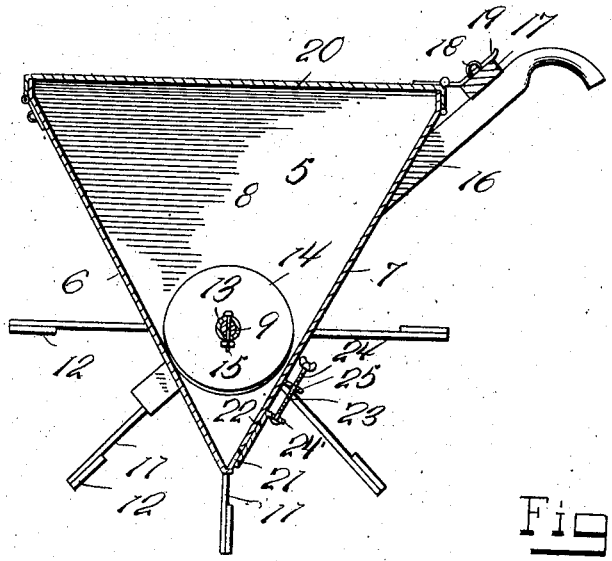
Figure 4:
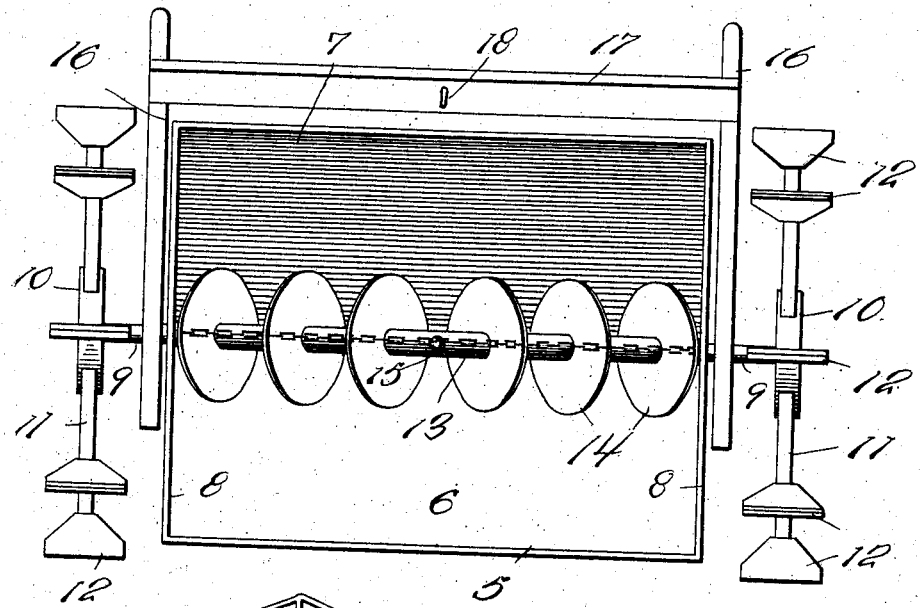
Figure 5:
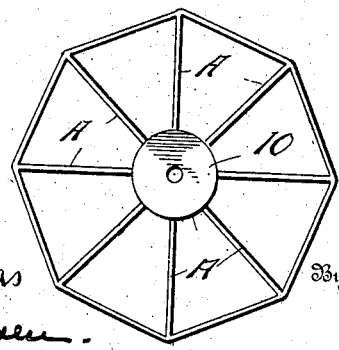

In the drawings forming a portion of this specification, and in which like numerals of reference indicate similar parts in the several views, Figure 1 is an end view of the present distributer. Fig. 2 is a central longitudinal section on line 2 2 of Fig. 1. Fig. 3 is a central transverse section on line 3 3 of Fig. 2, and Fig. 4 is a top plan view. Fig. 5 is an elevation of an alternative type of wheel.

Referring now to the drawings, the present invention comprises a hopper 5, including downwardly-convergent front and rear walls 6 and 7 and connecting end walls 8, the hopper being thus of V shape in cross-section. A shaft 9 is journaled horizontally in the ends 8 of the hopper and extends longitudinally therewithin, and mounted upon the outer ends of this shaft removably for rotation therewith there are disks 10, having radial arms 11, provided with feet 12 at their outer ends, these arms extending vertically. A sleeve 13 is removably engaged with the shaft within the hopper and has mounted concentric thereupon a plurality of parallel spaced disks 14, which extend at an angle to the shaft and to the vertical, the disks at opposite sides of the center of the sleeve being disposed oppositely. A confining-bolt 15 is passed through the sleeve and the shaft 9, but is removable to allow removal of the shaft from the sleeve and subsequent removal of the latter from the hopper.

Handles 16 are revolubly mounted upon the shaft at opposite ends of the hopper and extend upwardly and rearwardly therebeyond, the end portions of the handles being connected by cross members 17, to the upper of which there is attached a loop 18 for engagement through a hasp 19, carried by the hopper, so that the hopper is held normally against tipping with respect to the handles.

A top 20 is provided for the hopper, and in the wall 7, at the lower portion thereof, there is a longitudinally-extending horizontal slot 21, provided with a sliding closure 22, the latter being equipped with means 23 for moving it into and out of operative position and for holding it at different points of its movement, this means consisting of a set-screw 24, revolubly engaged at its lower end in an ear 24', carried by the closure 22, and having its threaded portion engaged in the threaded opening formed in an ear 25, carried by the wall 7, above the closure.

As shown, the disks 10 have their peripheries connected by chains Z, which are slack between the disks, so as to contact with the walls of the hopper and drag thereover when the shaft is revolved, thus further loosening and agitating the contents of the hopper.

In use fertilizer is disposed within the hopper, and the closure 22 having been adjusted to the correct point the implement is moved over the ground, resting upon the feet 12. These feet are thus caused to successively engage the ground, and the shaft is revolved to move the disks within the hopper and agitate the fertilizer to work it toward the opening. It has been found that with an agitator of this kind packing is likely to occur, and in order to jolt the fertilizer to cause it to fall between the disks a peculiar arrangement of the arms is provided, and these arms thus form rimless wheels, which rotate the shaft and disk and also jolt the implement, as described, to further agitate the fertilizer. When the hasp 19 is disengaged from the loop 18, the hopper may be moved upon the shaft with respect to the handles to dump its contents, as will be readily understood.

In Fig. 5 there is shown a wheel for use in larger horse-power sizes of the distributers, in which the outer ends of spokes A are connected by straight members, thus giving the wheel a polygonal shape.

What is claimed is—

1. A distributer comprising a hopper, a horizontal shaft removably journaled in the hopper, a sleeve removably engaging the shaft within the hopper, a bolt removably engaged in the sleeve and shaft, inclined disks carried by the sleeve, removable supporting members carried by the shaft outwardly of the hopper for rotation with the shaft, and slack chains connecting the disks.

2. A distributer comprising a hopper having a discharge-opening therein, an adjustable closure for the discharge-opening, a shaft journaled horizontally in the hopper longitudinally thereof, inclined disks carried by the shaft within the hopper for rotation therewith, disks removably engaged with the ends of the shaft outwardly of the hopper, radial supporting-arms carried by the last-mentioned disks in spaced relation, and handles carried by the shaft.

3. In a distributer, the combination with a hopper, of disks revolubly mounted in the hopper, and flexible connections between the disks arranged to extend at times beyond the peripheries of the disks.

4. In a distributer, the combination with a hopper, of disks revolubly mounted in the hopper, and a slack chain secured to the peripheries of the disks.

In testimony whereof I affix my signature in presence of two witnesses.

HENRY BORN VEEFKIND.

Witnesses:
  M. T. MILLER,
  H. E. CHANDLEE.